United States Patent [19]
Cohn et al.

[11] Patent Number: 5,745,735
[45] Date of Patent: Apr. 28, 1998

[54] LOCALIZED SIMULATED ANNEALING

[75] Inventors: John Maxwell Cohn, Richmond; David James Hathaway, Underhill Center, both of Vt.

[73] Assignee: International Business Machines Corporation, Armonk, N.Y.

[21] Appl. No.: 549,405

[22] Filed: Oct. 26, 1995

[51] Int. Cl.$^6$ .................................................... G06F 17/00
[52] U.S. Cl. .......................... 395/500; 395/20; 395/920; 364/578; 364/468.28
[58] Field of Search ........................... 395/500, 21, 13, 395/20, 920; 364/491, 408, 490, 468.28, 578; 382/14; 430/5; 324/309

[56] References Cited

U.S. PATENT DOCUMENTS

| | | | |
|---|---|---|---|
| 3,654,615 | 4/1972 | Freitag | 340/172.5 |
| 4,495,559 | 1/1985 | Gelatt, Jr. et al. | 364/148 |
| 4,607,339 | 8/1986 | Davis | 364/491 |
| 4,615,010 | 9/1986 | Davis et al. | 364/491 |
| 4,931,944 | 6/1990 | Richter et al. | 364/468 |
| 5,077,676 | 12/1991 | Johnson et al. | 364/489 |
| 5,134,685 | 7/1992 | Rosenbluth | 395/21 |
| 5,136,686 | 8/1992 | Koza | 395/13 |
| 5,153,923 | 10/1992 | Matsuba et al. | 382/14 |
| 5,159,682 | 10/1992 | Toyonaga et al. | 395/500 |
| 5,200,908 | 4/1993 | Date et al. | 364/491 |
| 5,218,551 | 6/1993 | Agrawal et al. | 364/491 |
| 5,224,056 | 6/1993 | Chene et al. | 364/490 |
| 5,225,991 | 7/1993 | Dougherty | 364/491 |
| 5,235,521 | 8/1993 | Johnson et al. | 364/489 |
| 5,237,514 | 8/1993 | Curtin | 364/490 |
| 5,308,798 | 5/1994 | Brasen et al. | 437/250 |
| 5,326,659 | 7/1994 | Liu et al. | 430/5 |
| 5,333,032 | 7/1994 | Matsumoto et al. | 364/489 |
| 5,339,253 | 8/1994 | Carrig et al. | 364/489 |
| 5,349,536 | 9/1994 | Ashtaputre et al. | 364/491 |
| 5,359,535 | 10/1994 | Djaja et al. | 364/489 |
| 5,363,313 | 11/1994 | Lee | 364/491 |
| 5,388,055 | 2/1995 | Tanizawa et al. | 364/491 |
| 5,402,357 | 3/1995 | Schaefer et al. | 364/490 |
| 5,416,718 | 5/1995 | Yamazaki | 364/488 |
| 5,432,447 | 7/1995 | Song | 324/309 |
| 5,557,533 | 9/1996 | Koford et al. | 364/491 |
| 5,563,783 | 10/1996 | Stolfo et al. | 364/408 |
| 5,568,636 | 10/1996 | Koford | 395/500 |
| 5,619,419 | 4/1997 | D'Haeseleer et al. | 364/490 |
| 5,636,125 | 6/1997 | Rostoker et al. | 364/468.28 |

OTHER PUBLICATIONS

"New Algorithms for the Placement and Routing of Macro Cells", by W. Swartz and C. Sechen, IEEE, Computer–Aided Design, 1990 International Conference, pp. 336–339.

"Techniques for Simultaneous Placement and Routing of Custom Analog Cells in Koan/Anagram II", by J. Cohn et al., IEEE, Computer–Aided Design, 1991 International Conference, Feb. 1991, pp. 394–397.

"Heuristic Technique for Processor and Link Assignment in Multicomputers", by Bollinger et al., IEEE Transactions on Computers, vol. 40, No. 3, Mar. 1991, pp. 325–333.

(List continued on next page.)

*Primary Examiner*—Kevin J. Teska
*Assistant Examiner*—Russell W. Frejd
*Attorney, Agent, or Firm*—Schmeiser, Olsen & Watts; Richard M. Kotulak

[57] ABSTRACT

According to the present invention, a method of optimization by simulated annealing is provided that uses a spatial metric to localize the simulated annealing temperature, the move set, and the objects which the moves operate on. The method keeps a local history of the optimization process. The localization allows the simulated annealing process to adaptively control the annealing schedule of each local region independently. This allows the annealing temperature, move set, and the objects upon which the move set operates to each be adjusted for each region independently to maximize efficiency. This results in optimization of all regions in a quick and efficient manner.

18 Claims, 3 Drawing Sheets

OTHER PUBLICATIONS

"Best–So–Far vs. Where–You–Are: New Perspectives on Simulated Annealing for CAD", by K. Boese et al., IEEE, European Design Automation Conference, 1993 and EURO–VHDL 1993, Jan. 1993, pp. 78–83.

"Optimization Based Job Shop Scheduling", by K. Musser et al., IEEE Transactions on Automatic Control, vol. 38, No. 5, May 1993, pp. 808–813.

"Combinatorial Optimization of Distributed Queries", by B. Groselj and Q. Malluhi, IEEE Transactions on Knowledge and Data Engineering, vol. 7, No. 6, Dec. 1995, pp. 915–927.

Kudoh, M., et al., LSI Low Power Oriented Layout Method with Net Switching Factors, *IBM Technical Disclosure Bulletin*, Jun. 1993, vol. 36, No. 06B, pp. 505–507.

Gonsalves, G. J., Technology Mapping Using Simulated Annealing, *IBM Technical Disclosure Bulletin*, Aug. 1990, vol. 33, No. 3A, p. 308.

Author Unknown, Method to Achieve Equal Capacitance on a Group of Nets During Circuit Layout and Placement, *Research Disclosure*, Mar. 1989, No. 299, Kenneth Mason Publications Ltd., England.

Lam, Jimmy, et al., Performance of a New Annealing Schedule, *IEEE*, 1988, pp. 306–311.

Darema–Rogers, F., et al., Parallel Simulated Annealing Method for Highly Parallel Multiple Computer Processors, *IBM Technical Disclosure Bulletin*, Dec. 1987, vol. 30, No. 7, pp. 106–107.

Huang, M. D., et al., An Efficient General Cooling Schedule for Simulated Annealing, *IEEE*, 1986, pp. 381–384.

Kirkpatrick, S., et al., Optimization by Simulated Annealing, *Science*, May 13, 1983, vol. 220, No. 4598, pp. 671–680.

LOCALIZED SIMULATED ANNEALING

RELATED APPLICATION

This application is related to patent application Ser. No. 08/547,686 filed on Oct. 19, 1995, invented by David James Hathaway entitled "INCREMENTAL SKEW COST CALCULATION," which is incorporated herein by reference.

BACKGROUND OF THE INVENTION

1. Technical Field

This invention generally relates to optimization methods for solving complex problems, and more specifically relates to optimization by simulated annealing.

2. Background Art

Combinatorial optimization problems are commonly solved using a variety of optimization routines. These combinatorial optimization problems are characterized by the search for the minimum of a given function having many different parameters. The vast number of parameters and the complexity of the problem makes acceptable solutions to these problems very time consuming and difficult to find.

One routine used to optimize these problems is simulated annealing. Simulated annealing is a randomized local search method for finding near optimal solutions to combinatorial optimization problems. Simulated annealing models the atomic distribution that occurs in cooling material during an annealing process.

Simulated annealing operates by proposing a large number of random "moves", where a move can be any sort of change to the problem state. The random moves that improve the problem state, usually represented by a cost function, are always accepted. Random moves that degrade the problem state as represented by the cost function may be accepted, with a probability based upon a Boltzmann's probability distribution. A Boltzmann's probability distribution may be represented as follows:

$$P(\Delta C) = \exp\left(\frac{-\Delta C}{T}\right)$$

Where $P(\Delta C)$ is the probability that a move which degrades the cost function will be accepted. C is the cost function which is being minimized, and $\Delta C$ is the change in the cost function due to the proposed move (where a positive value of $\Delta C$ is a degradation). Additionally, T is the annealing "temperature." In simulated annealing, the temperature T is used to define and adjust the Boltzmann's distribution as the optimization process continues.

The simulated annealing process starts using a high temperature T, resulting in a large percentage of moves that degrade the cost function by $\Delta C$ being accepted. The high temperature also allows larger moves, even those that degrade C significantly, to be accepted. Accepting significant degradation in C allows the optimization routine to "bounce out" of local minimum in the cost function C in search of the global minimum. The temperature is slowly lowered, effectively limiting the size of the moves that can be made, the amount of cost degradation that will be accepted and hence the "depth" of the local minimum the routine can bounce out of. The process of proposing moves, accepting and rejecting them while lowering the temperature allows the simulated annealing routine to find the global minimum of the cost function, and hence achieve full optimization. For a general discussion of simulated annealing see "Optimization by Simulated Annealing," S. Kirkpatrick, C. D. Gelatt, and M. P. Vecchi, Science Volume 220, Page 671–680 (May 1983), which is herein incorporated by reference.

Thus, a simulated annealing problem formulation must have a set of moves which are used to modify the state of the problem. There must also be a way to reject a proposed move, either by undoing a move after it is done, or by pre-evaluating the cost change $\Delta C$ and accepting or rejecting a move based upon the cost change. A simulated annealing problem formulation must also have a global cost function to be minimized, the change in which is evaluated after each proposed move.

The process of optimization by simulated annealing is guided by an annealing schedule. Thus, the rate of temperature decrease, the number of moves proposed at each temperature, the move set (a predetermined list of possible moves used to change the problem state), the probability of proposing different moves in the move set, and/or the objects the move set operates can each be determined by the annealing schedule. Many methods are used to develop an annealing schedule in order to get the best possible results in the minimum possible time. Some of these methods use "feedback" and examine the history of the optimization process in order to adaptively adjust the annealing schedule. These adaptive methods will adjust how many moves to try at each temperature, and will determine when and to what new value the temperature should be changed and may also adjust the probabilities that certain moves will be proposed. The adaptive methods generally use the rate of change in the global cost, the number of moves being accepted, and the average change in cost due to proposed moves to determine the annealing schedule.

One adaptive method used to determine the annealing schedule compares the rate of moves being accepted with a precomputed profile and adjusts the schedule of the temperature decrement and move set to force the optimization routine accordingly. For a discussion of other dynamic methods to determine annealing schedules see: M. D. Huang, T. F. Romeo and A. Sangiovanni-Vincentelli, "An Efficient General Cooling Schedule for Simulated Annealing," Proceedings of the 1986 International Conference on Computer-Aided Design, pp. 381–384; J. Lam, J. M. Delosme, "Performance of a New Annealing Schedule" 25th ACM/IEEE Design Automation Conference, 1988, pp. 306–311, which are both incorporated herein by reference. One problem with annealing schedules as determined in the related art is that they look at global characteristics of the optimization process to come up with a single annealing temperature. This ignores the fact that there may be some regions of an problem which have already settled to a well optimized, relatively low cost state, while other regions are farther from their optimum state. For regions that are more optimized than reflected by the global temperature, the global temperature is too high and the simulated annealing process will take much longer than is really required, since it will be accepting moves which to do not effectively optimize these regions. For regions that are not as well optimized, the global temperature is too low, and the annealing scheduler will set a temperature that may prematurely freeze these regions which would ideally require annealing at higher temperature.

One method that was attempted to overcome this limitation is to divide the problem into several smaller problems. This allows for the simulated annealing to find the local minimum of each of the smaller problems. Such methods are often called hierarchical or parallel approaches. Unfortunately, because the problem is permanently divided, moves that effect multiple "problems," such as moving an element from one small problem to another are typically not allowed. Limiting the number of possible moves that can be used to adjust the problem state is a significant limitation in the optimization process. The optimization is especially limited where the problem elements were assigned to the wrong smaller problem initially, and are prevented from being moved to a more desirably area. Such a limitation may prevent the simulated annealing routine from finding the most optimized solution to the problem. For these reasons, dividing up a problem into separate smaller problems is not typically used in simulated annealing.

Therefore, there existed a need to provide a method for optimization using simulated annealing that fully optimizes local regions in the context of a larger optimization problem, in a quick and efficient manner.

DISCLOSURE OF INVENTION

According to the present invention, a method of optimization by simulated annealing is provided that uses a spatial metric to localize the simulated annealing temperature, the move set, and the objects which the moves operate on. The method keeps a local history of the optimization process. The localization allows the simulated annealing process to adaptively control the annealing schedule of each local region independently. This allows the annealing temperature, the number of moves attempted at each temperature, the move set, and the objects upon which the move set operates to each be adjusted for each region independently to maximize efficiency. This results in optimization of all regions in a quick and efficient manner.

The foregoing and other objects, features and advantages of the invention will be apparent from the following more particular description of a preferred embodiment of the invention, as illustrated in the accompanying drawings.

BRIEF DESCRIPTION OF DRAWINGS

The preferred exemplary embodiment of the present invention will hereinafter be described in conjunction with the appended drawings, where like designations denote like elements, and.

BEST MODE FOR CARRYING OUT THE INVENTION

Figure 1:
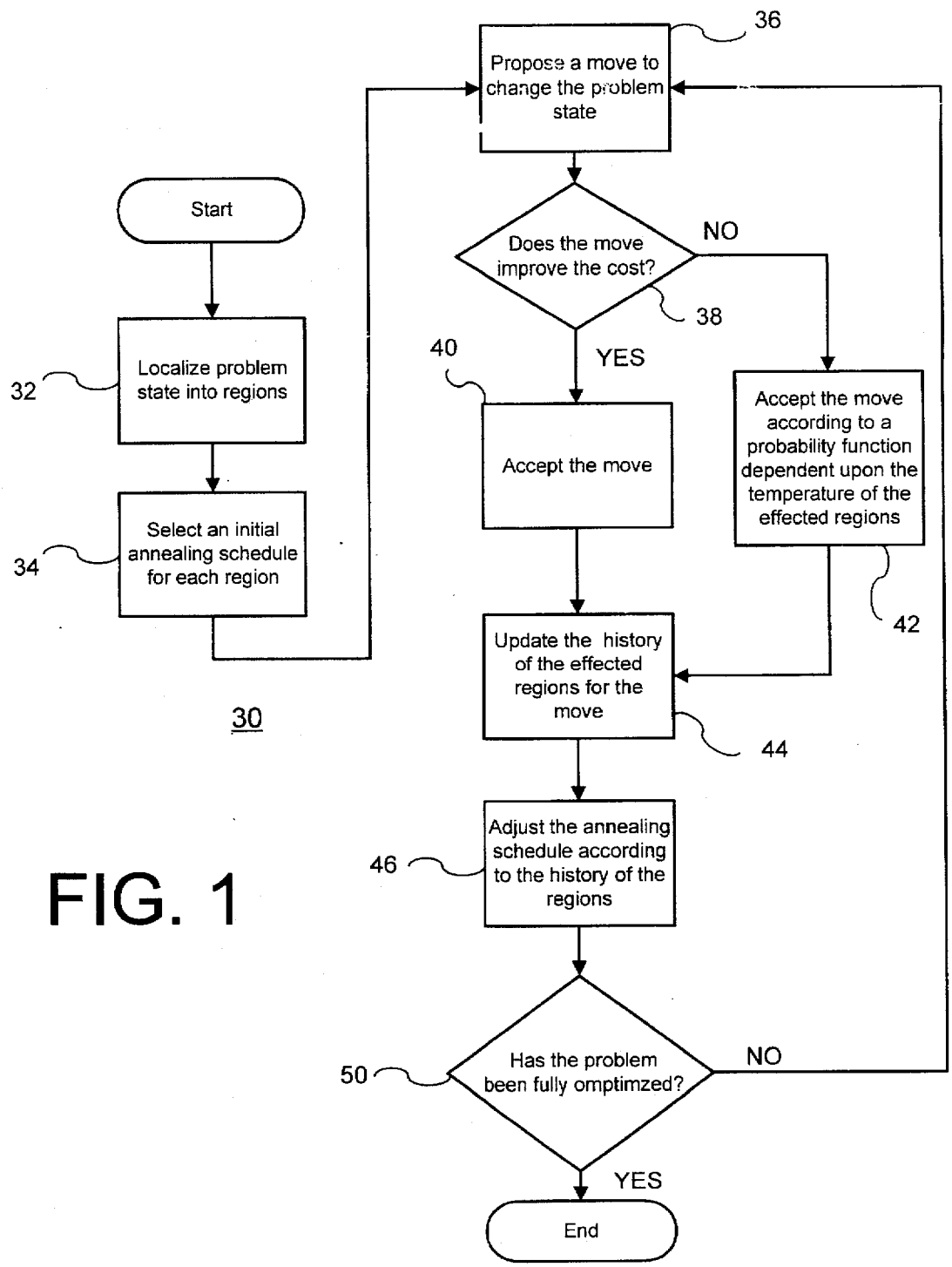
FIG. 1 is a flow diagram illustrating a simulated annealing method in accordance with the present invention.

According to the present invention, a method of optimization by simulated annealing is provided that uses a spatial metric to localize the temperature, the move set, and the objects which the moves operate on. A particular embodiment of the method of the present invention is shown in FIG. 1. FIG. 1 is a flow diagram illustrating a simulated annealing method 30. The simulated annealing method 30 can be used to minimize a problem state, as represented by a cost function.

The first step 32 is to localize the problem state into regions. Typically, the problem state can be localized using any appropriate spatial metric. A spatial metric in this context is a set of parameters which can be used to assign components of the problem to different regions. The spatial metric should be chosen such that components which are close with regard to the spatial metric (i.e., the difference in the values of the parameters comprising the spatial metric is small) strongly interact (i.e., they have some relationship which has a significant effect on the cost function). For example, in a chip placement problem where the components are the circuits being placed on the chip, the spatial metric might be composed of the x and y locations of a circuit, and the localization might divide the chip area into a grid of rectangular regions, assigning components to the region containing the x and y location.

Figure 2:
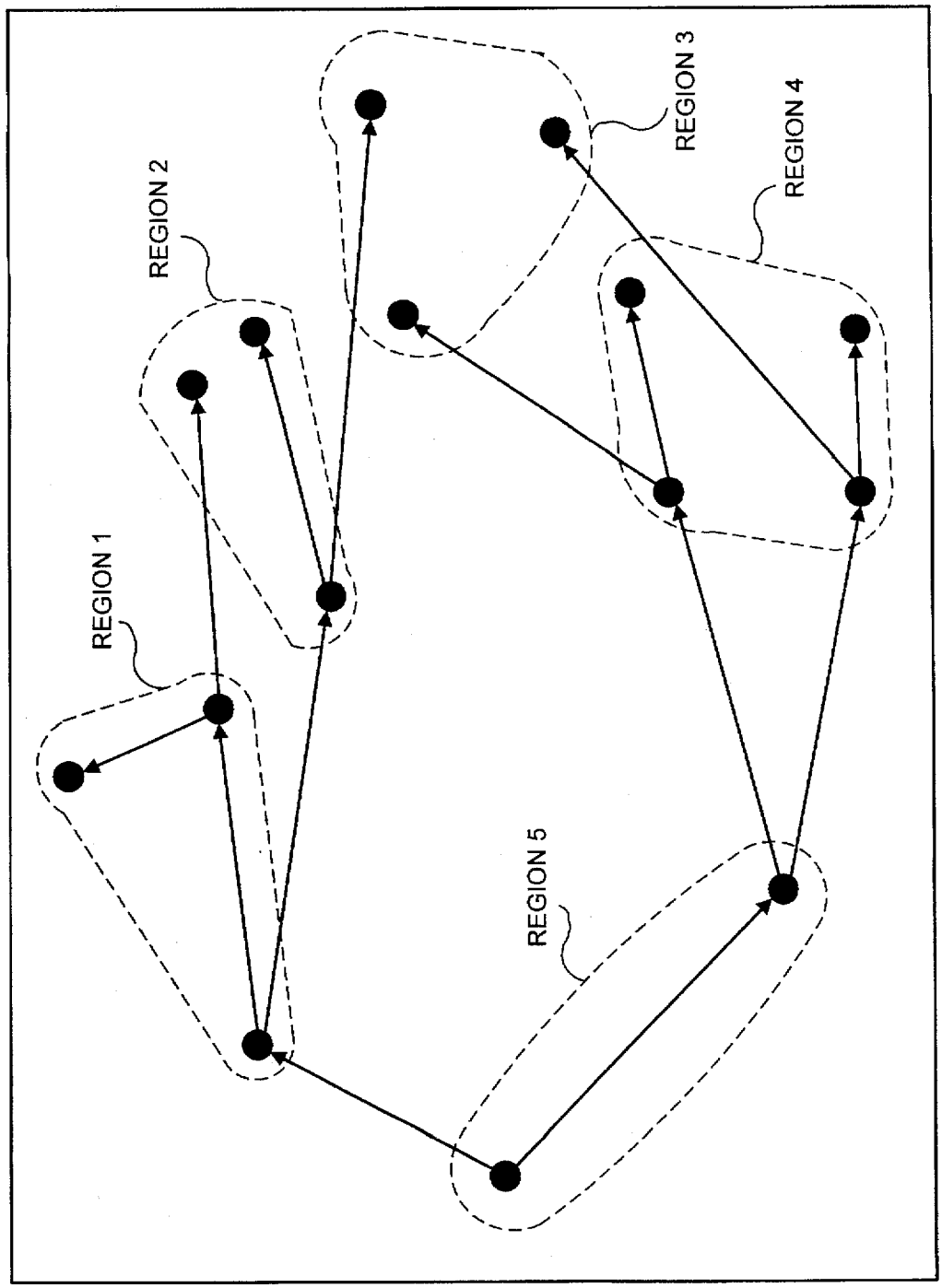
FIG. 2 is a schematic view illustrating a simulated annealing problem divided into localized regions in accordance with the present invention.
Figure 3:
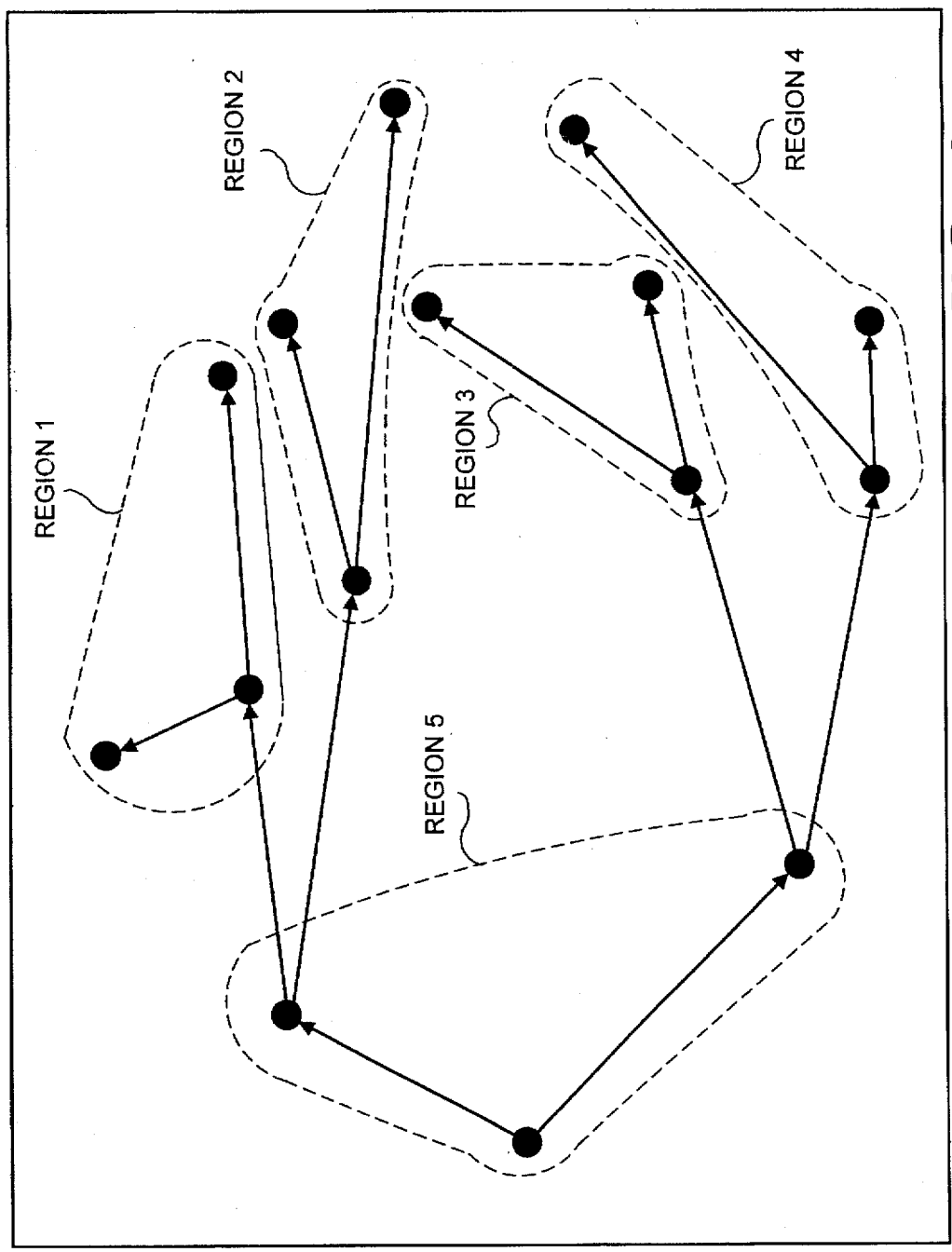
FIG. 3. is a schematic view illustrating a simulated annealing problem divided into localized regions in accordance with the present invention.

As another example, in a clock tree optimization problem, the spatial metric may localize according to clock sink location on a device, as illustrated in FIG. 2. In FIG. 2, the sinks of the clock tree are localized into five regions corresponding to their locations on the device. As another example, again in a clock tree optimization problem, the space might be localized by connectivity, as represented by FIG. 3, where sinks fed by the same nodes of the clock tree are localized into five regions together. Another approach could localize the problem state according to a multi-dimensional space with dimensions corresponding to the different problem characteristics (e.g., time, physical distance, connectivity).

The localizing of the problem state into regions differs with prior methods that have arbitrarily divided the problem into smaller separate problems, with each smaller problem treated separately with its own cost function. The step 32 differs in that localizing the problem states allows for moves to optimize the interaction between subproblems. This is accomplished by keeping a global cost function that is to be minimized. In contrast, subdividing the problem into separate smaller problems inhibits the use of moves such as moving an object from one region to another.

Returning to FIG. 1, the next step 34 is to select an initial annealing schedule for each region. In the preferred embodiment the annealing schedule would typically include the move set, the probabilities of certain moves being proposed, the objects the move set will operate on, an initial localized temperature $T_{local}$ for each of the regions, and the number of moves proposed at each temperature. Thus, for the problems of FIGS. 2 and 3, $T=\{T_1, T_2, T_3, T_4, T_5\}$, with a separate, localized temperature stored for each region. Typically, the initial value of each localized temperatures would be the same at the beginning of the optimization process. This value would be selected according to the type of annealing schedule that is to be used on the problem state. One method is to start at a relatively low temperature and slowly increase the temperature until a predetermined percentage of moves are accepted.

The next step 36 is to propose a move to change the problem state. The move would typically be selected in a random or quasi-random fashion, according to the annealing schedule. The types of moves available in the move set would depend upon the exact nature of the problem that is being optimized.

The next step 38 is to determine whether the proposed move improves the problem state as represented by the cost function. The process of evaluating the proposed move would again depend upon the particular problem being optimized. If the move improves the cost function, then the next step 40 is to accept the move and change the problem state. If the move instead degrades the cost function, then the next step 42 is to decide whether to accept the move based on a Boltzmann's distribution, where $P(\Delta C)$ equals the probability a move that degrades the cost function by $\Delta C$ will be accepted. The probability distribution is defined as:

$$P(\Delta C) = \exp\left(\frac{-\Delta C}{T_{local}}\right)$$

Again, T is the annealing temperature. According to the present invention, however, the temperature is $T_{local}$, the temperature as localized for each region of the problem state. The move will be accepted with a probability function according to the temperature $T_{local}$ of the regions that the proposed move affects. Therefore, if the proposed move affected region 3 of FIG. 2, then the value of $T_3$ would be used for the temperature. The temperature $T_3$ and $\Delta C$ would define the probability of the move being accepted.

If the proposed move affects multiple regions, then evaluation of the proposed move should be done according to the temperatures of all of the multiple effected regions. One method to evaluate a move that effects multiple regions is to use the geometric or arithmetic mean of all temperatures affected. Thus if a proposed move affected regions 3 and 4 of FIG. 2, then the mean of $T_3$ and $T_4$ would be used for $T_{local}$ to determine the probability $P(\Delta C)$ of accepting the move.

The next step 44 is to update the annealing history of the regions affected by the move. In the preferred embodiment, an adaptive method with feedback from the annealing history is used to determine the annealing schedules of the optimization routine. As with prior adaptive methods, a history of the annealing process is created and stored, and that history is used to adjust the annealing schedule. The present invention differs in that the spatial metric is used to keep a local, rather than global, history of the optimization process for each region. Thus, for the problem of FIG. 2, a local history of the optimization process is kept for each of the five regions.

In keeping local history information about the process to guide the annealing schedule, we must include in that history information about any moves which affect the cost function of a given region. For example, information about a move that moves an object from one region to another must be kept in both the source and destination region histories.

The next step 46 is to adaptively adjust the annealing schedule according to local history of the regions. The local histories allow for adaptive techniques to be used to adjust the annealing schedule of each region separately. Thus, the localized temperatures can be adjusted independently, rather than as a global temperature. Additionally, the move set, the objects the move set operates on, the probability of moves being proposed, can each be localized and adjusted independently for each region. These independent adjustments allow the optimization of different regions of a problem space to proceed at different rates. Thus, for the problem of FIG. 2, the annealing schedule can be varied for each of the five regions, including the annealing temperature and move set for each of the five regions.

The next step 50 is to determine whether the problem has been fully optimized. This will typically be determined by the annealing schedule. In the disclosed method, the optimization cannot be considered complete until annealing has been completed for all regions. Thus, it will not be complete until all regions need to have been brought down to a final low temperature.

Until all regions have been fully optimized, the method returns to step 36, where another move is proposed to change the problem state. Again, the proposed move is selected from the move set, and in accordance with the present invention, the localized histories would be used to guide the selection of the proposed move. For example, in one preferred method, the moves would be selected preferentially to operate in the regions of the highest current temperature. This concentrates the optimization effects on the regions that are farthest from the optimum. Additionally, the objects the move set operates upon could be adjusted according to the local histories, thus affecting the selecting of a proposed move.

While the invention has been particularly shown and described with reference to preferred exemplary embodiments thereof, it will be understood by those skilled in the art that various changes in form and details may be made therein without departing from the spirit and scope of the invention.

We claim:

1. An adaptive method for creating a simulated annealing schedule to solve an optimization problem by simulated annealing, wherein the optimization problem is represented by a global cost function, and wherein the simulated annealing solves said problem by proposing and selecting a plurality of moves from a move set, the method comprising the steps of:
   a) localizing said problem represented by said global cost function into a plurality of regions;
   b) maintaining an annealing history for each said region; and
   c) determining a simulated annealing temperature for each of said plurality of regions, each of said simulated annealing temperatures being a function of its associated annealing history.

2. The method of claim 1 further comprising the step of generating a localized move set for each of said plurality of regions, and adjusting said localized move sets according to said associated annealing history maintained for said region corresponding to said localized move sets.

3. The method of claim 1 further comprising the step of adjusting a probability of a move being proposed that affects at least one of the plurality of regions according to the localized annealing history of said at least one region.

4. The method of claim 1 wherein said move set operates upon a plurality of objects, and further comprising the step of localizing said objects which said move set operates upon and adjusting said objects said move set operates upon for each of said plurality of regions according to said associated annealing history maintained for said region corresponding localized objects.

5. The method of claim 1 wherein said move set operates upon a plurality of objects, and further comprising the step of preferentially selecting an object on which to perform a move according to said annealing histories maintained for said plurality of regions.

6. The method of claim 1 wherein the step of determining an annealing history for each of said problem regions further comprises the steps of: recording the moves proposed that would effect each said region; and recording the percentage of said moves accepted for each said region.

7. A simulated annealing method of optimizing a combinatorial problem, said problem having a global cost function to be minimized, the method comprising the steps of:
   a) localizing said problem into a plurality of regions;
   b) determining a plurality of annealing schedules, each annealing schedule associated with one of said plurality of regions, wherein each of said plurality of annealing schedules is adaptively determined according to an annealing history of said associated region;
   c) proposing a move in said problem, said move affecting at least one region, and wherein said move changes said global cost function; and d) evaluating said move according to said temperature of said at least one affected region and said change of global cost function.

8. The method of claim 7 wherein each of said plurality of annealing schedules includes an annealing temperature, wherein each of said annealing temperatures is adaptively determined according to said annealing history of said associated region.

9. The method of claim 7 wherein each of said plurality of annealing schedules includes a move set, wherein each of said move sets is adaptively determined according to said annealing history of said associated region, and wherein the step of proposing a move comprises selecting said move from a move set.

10. The method of claim 7 wherein the step of proposing a move further comprises the step of: randomly proposing said move and wherein each of said plurality of annealing schedules includes a probability of said move being selected, and wherein the probability of a move being selected is adaptively determined according to said annealing history of said associated region.

11. The method of claim 7 wherein each of said plurality of annealing schedules includes objects which a move set operates upon, wherein the objects which a move set operates upon are adaptively determined according to said annealing history of said associated region.

12. The method of claim 7 wherein each of said plurality of annealing schedules includes an annealing temperature, a move set, and a probability of a move being selected, and wherein said annealing temperature, said move set, and said probability of a move being selected are each adaptively determined according to said annealing history of said associated region.

13. The method of claim 7 wherein said problem is localized according to physical region.

14. The method of claim 7 wherein said problem is localized according to connection.

15. The method of claim 8 wherein said proposed move affects a plurality of said localized regions, and wherein said proposed move is evaluated according to said geometric mean of said temperatures of said plurality of affected regions.

16. The method of claim 8 wherein said proposed move affects a plurality of said localized regions, and wherein said proposed move is evaluated according to said arithmetic mean of said temperatures of said plurality of affected regions.

17. A simulated annealing method of optimizing a combinatorial problem, said problem having a global cost function to be minimized, the method comprising the steps of:

a) dividing up said problem into a plurality of spatial regions;

b) selecting a plurality of temperatures, each temperature associated with one of said spatial regions, wherein each said temperature is adaptively selected according to an annealing history of said associated spatial region;

c) proposing a move in said problem, wherein said move is proposed adaptively according to said plurality of temperatures, said move effecting at least one spatial region, and wherein said move changes said global cost function;

d) evaluating said proposed move, wherein said move is accepted if it improves said global cost function, and wherein said move is accepted if it degrades said global cost function according to a probability which is a function of said mean temperature of said at least one effected region.

18. The method of claim 17 wherein the step of proposing a move comprises selecting a move from a move set, wherein said move set is localized according to said problem regions.

* * * * *